No. 676,580. Patented June 18, 1901.
I. J. FRENCH.
SEALING DEVICE FOR FAUCETS, &c.
(Application filed May 19, 1900.)

(No Model.)

Witnesses
Inventor
Irwin J. French
By
Attorneys

THE NORRIS PETERS CO., PHOTO-LITHO., WASHINGTON, D. C.

UNITED STATES PATENT OFFICE.

IRWIN J. FRENCH, OF WASHINGTON, DISTRICT OF COLUMBIA, ASSIGNOR OF ONE-HALF TO JAMES BENNETT, OF SAME PLACE.

SEALING DEVICE FOR FAUCETS, &c.

SPECIFICATION forming part of Letters Patent No. 676,580, dated June 18, 1901.

Application filed May 19, 1900. Serial No. 17,269. (No model.)

*To all whom it may concern:*

Be it known that I, IRWIN J. FRENCH, a citizen of the United States, residing at Washington, in the District of Columbia, have invented a new and useful Improvement in Sealing Devices for Faucets, &c., of which the following is a specification.

My invention relates to means of seating the casings of faucets, valves, cocks, &c.; and it consists in forming the casing of the faucets, valves, cocks, &c., with annular seats adapted as faces for the edges of flanges upon the valve, as fully set forth hereinafter and as illustrated in the accompanying drawings, in which—

Figure 1:
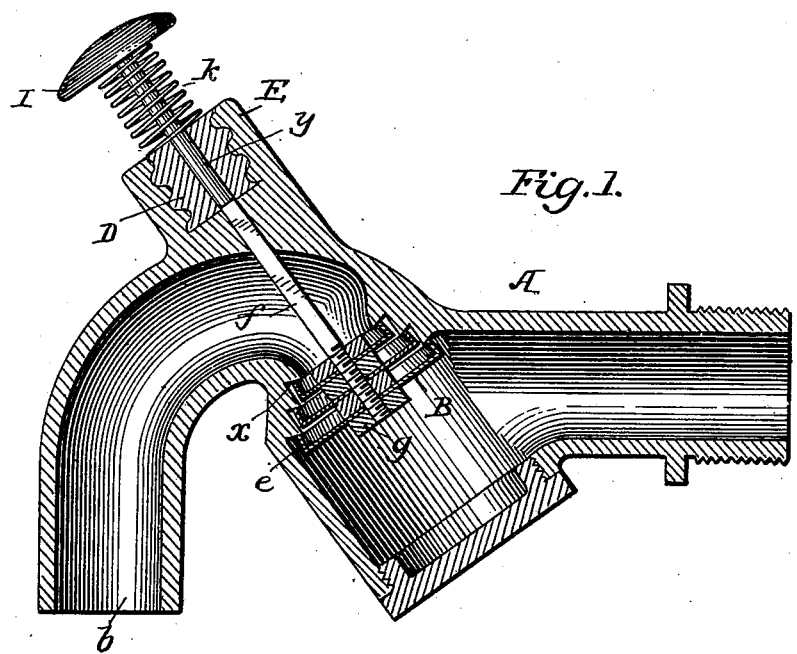

Figure 1 is a sectional view of a faucet with my improvement; Figs. 2, 3, 4, and 5, sectional views illustrating different arrangements of the valve-flanges in respect to the seats.

Figure 3:
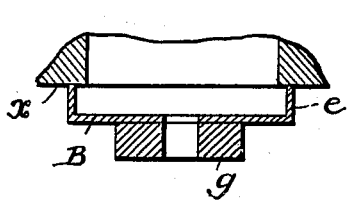
Figure 4:
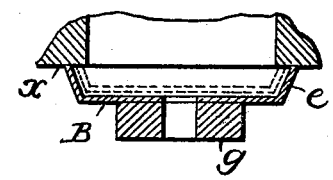
Figure 5:
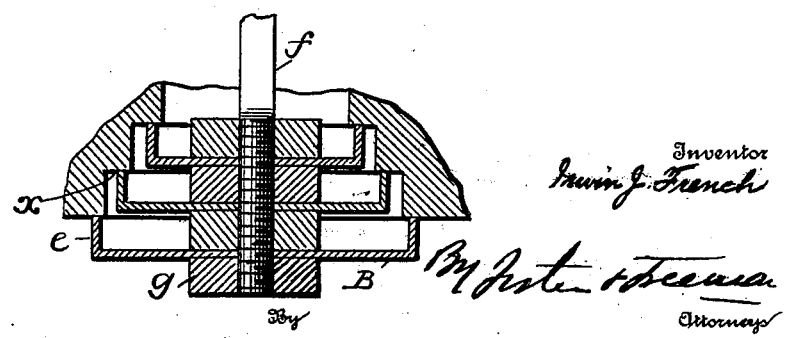

The casing A is of any suitable form and proportions, with a tubular inlet $a$, nozzle $b$, and intermediate port surrounded by valve-seats $x$. The valve-seats are annular, and all parts may be upon one plane, as shown in Figs. 3, 4, and 5, or preferably they may be inclined as well as annular, as shown in Figs. 1 and 2.

The valve B is a disk supported in a plane opposing that of the valve-seat and provided with a side flange $e$, the edge of which bears against the valve-seat. This flange may be at right angles to the body of the valve, as in Fig. 3, or it may be inclined thereto inward, as shown in Fig. 2, or outward, as shown in Fig. 4. There will of course be as many flanged disks as there are seats. I have found that by providing the valve with a flange having an edge bearing upon an annular seat I am enabled to secure a very close joint when the valve is on its seat and to maintain the faces which contact to make the joint—that is, the valve-face and the edge of the flange—in a better condition for preventing leakage than with constructions usually employed. The main advantage, however, results in the use of a relatively inclined flange and seat, as in Figs. 1, 2, and 4, because in such case as the edge of the valve wears or is ground away it finds a new bearing-face upon the seat, as indicated by dotted lines, Fig. 4.

Figure 2:
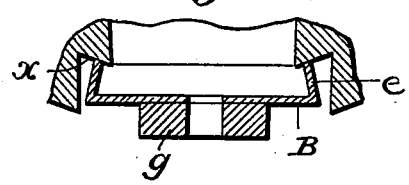

By making the valve-seat inclined as well as annular, as shown in Figs. 1 and 2, any pressure of the valve against the seat tending to force the flange $e$ inward—as, for instance, the water-pressure upon the valve—also tends to tighten the joint. In this case, as in the construction illustrated in Fig. 4, a new bearing-face is secured as the flange wears away, if the latter is inclined inward, as shown.

One of the main advantages of a valve having a plurality of flanges with an edge bearing in connection with a multiple seat—that is, a seat having a plurality of annular faces of different diameters—is that if there should be a slight leakage at one section of the valve the other section will present a closed joint, and when the annular bearing-faces are also inclined, as shown in Fig. 1, additional security is afforded from the pressure of the fluid acting to force the flanges against their seats.

Preferably each valve or valve-section is stamped of sheet metal connected centrally to the valve-stem $f$, so that there is such an amount of elasticity in the disk portion of the valve as will insure the flanges being forced against the seat by the fluid-pressure without that accurate making of the parts which will be necessary if each valve or valve-section was absolutely rigid and unyielding.

In order to secure the valves to the stem, each valve has brazed thereto a nut $g$, which may be screwed onto the portion of the stem $f$, as shown. In a valve of this character it is not necessary that the stem should turn, as better results can be secured by imparting to it a sliding motion only. That portion of the stem, therefore, which passes through the casing A is angular in cross-section; but that part $y$ beyond is preferably rounded to receive the packing D.

Instead of making use of a packing-box E with a gland or follower to hold the packing in place I internally thread the said box, which is permanently open at the outer end, and I provide an elastic or compressible packing-block D, threaded externally to fit the threaded box, so that the packing may be secured into the box and will there remain in place without further means of holding it.

The valve-stem is provided at the outer end with a suitable handle I, between which and the box E intervenes a coiled spring $k$, which tends to carry the valve-stem and valve outward, the valve being then held in place by fluid-pressure and being opened by pressure upon the handle I. Any other means, however, of manipulating the valve may be employed and different means of packing the same may be used.

While I have referred to my invention preferably as for use in faucets, I do not limit its application thereto, as the casing may be the casing of a retort, boiler, tank, &c., and the invention used whenever an opening has to be temporarily but tightly sealed.

Without limiting myself to the precise construction and arrangement of parts shown and described, I claim as my invention—

1. A casing provided with a plurality of annular seats of different diameters, in combination with a valve comprising a plurality of disks of different diameters supported on a stem, each disk having a peripheral flange extending at an angle therefrom and the edges of the respective flanges forming the contacting surfaces with the respective seats, substantially as set forth.

2. The combination with a valve comprising a plurality of disks of different diameters supported upon a stem and spaced apart, each disk having a peripheral flange extending at an angle thereto, and a casing provided with a plurality of annular seats of different diameters with which the edges of the flanges are adapted to engage, the planes of the seats and the angles of the flanges all being inclined to the planes of the disks, substantially as set forth.

3. The combination in a faucet of a casing having inlet and outlet ports, valve-seat, and an internally-threaded packing-box open at its outer end, an elastic or compressible packing-block threaded externally and screwed into the box and having a central opening, a valve-stem slidingly supported in the packing-block and carrying a valve at its inner end to engage the valve-seat, substantially as set forth.

In testimony whereof I have signed my name to this specification in the presence of two subscribing witnesses.

IRWIN J. FRENCH.

Witnesses:
 CHARLES E. FOSTER,
 HOWARD M. GILLMAN, Jr.